United States Patent [19]
Birnie

[11] Patent Number: 5,445,110
[45] Date of Patent: Aug. 29, 1995

[54] PET FEEDING SYSTEM WITH DISPOSABLE INSERTS

[76] Inventor: Virita L. Birnie, 22661 Marlin Pl., West Hills, Calif. 91307

[21] Appl. No.: 208,232

[22] Filed: Mar. 10, 1994

[51] Int. Cl.⁶ .................................................. A01K 5/01
[52] U.S. Cl. ........................................ 119/61; 220/406
[58] Field of Search .................. 119/61; 220/406, 405, 220/407

[56] References Cited

U.S. PATENT DOCUMENTS

| | | | |
|---|---|---|---|
| 2,542,413 | 2/1951 | Ibsch, Jr. | 119/61 |
| 3,498,268 | 3/1970 | Sleith et al. | 119/61 |
| 3,527,192 | 9/1970 | Ferrara | 119/61 |
| 3,698,594 | 10/1972 | Boehlert | 119/61 |
| 3,749,063 | 7/1973 | Buffum | 119/61 |
| 3,991,719 | 11/1976 | Bruce | 119/61 |
| 4,800,845 | 1/1989 | Budd | 119/61 |
| 5,000,123 | 3/1991 | Morse et al. | 119/61 |

FOREIGN PATENT DOCUMENTS 233673  3/1960  Australia .............................. 220/405

Primary Examiner—Todd E. Manahan

[57] ABSTRACT

An animal feeding system includes a bowl having an inner surface, an outer surface, a bottom, and an upper periphery. The system also includes a base having a top and a bottom with the top of the base being integral with the bottom of the bowl. A plurality of liners are also included. Each of the liners has a shape which approximately conforms to the inner surface of the bowl. Each of the liners further has an inner surface, an outer surface, and an upper periphery. The liners are in a stacked relationship such that the outer surface of the second liner lies adjacent to the inner surface of the first liner, and the inner surface of the second liner lies adjacent to the outer surface of the third liner. The liners are positioned within the bowl of the system with an adhesive tab and a diametrically opposed thumb notch for each liner circumferentially offset from the next adjacent liner.

1 Claim, 2 Drawing Sheets

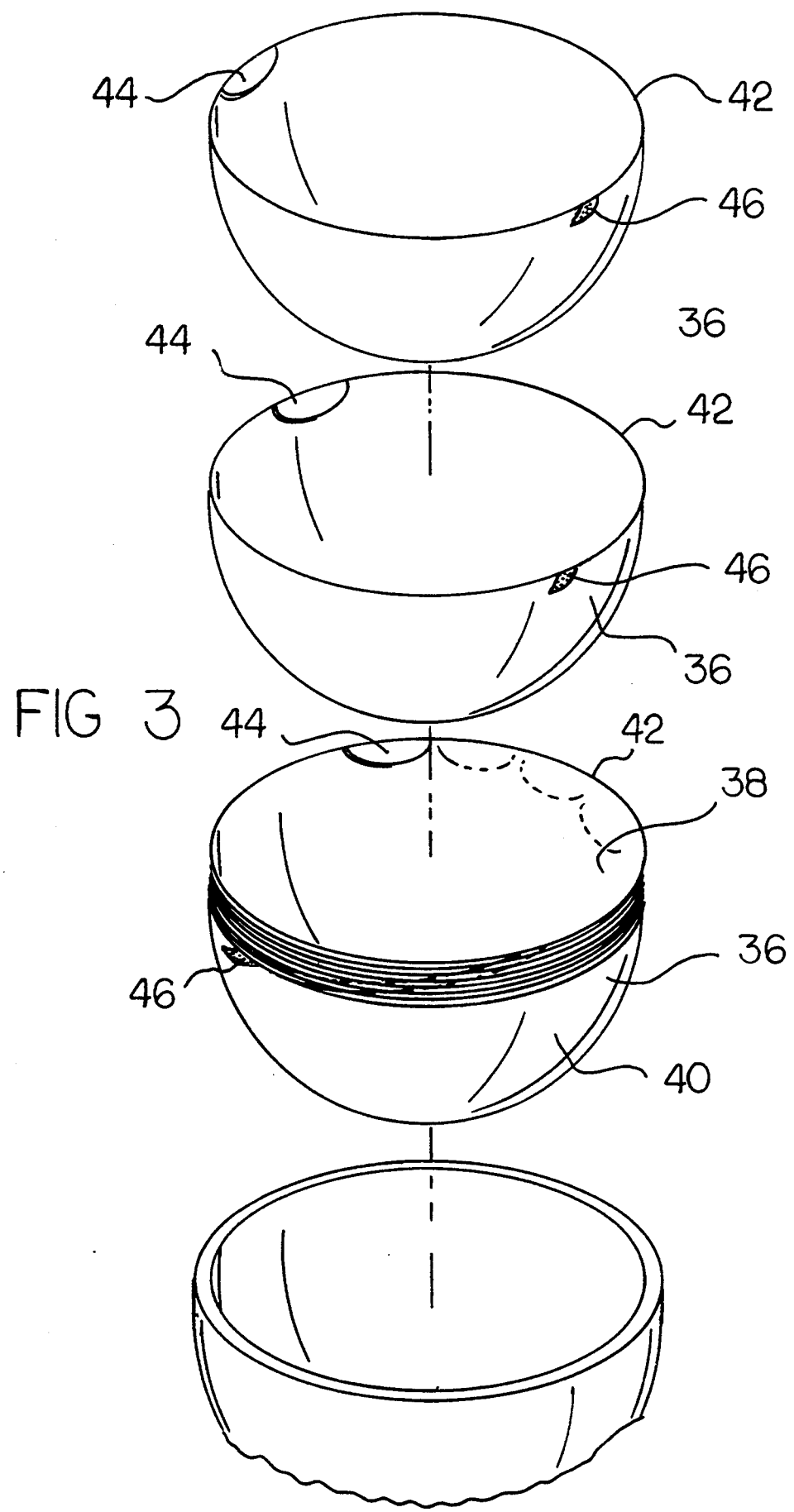

PET FEEDING SYSTEM WITH DISPOSABLE INSERTS

BACKGROUND OF THE INVENTION

1. Field of the Invention

The present invention relates to a pet feeding system with disposable inserts and, more particularly, pertains to keeping pet food bowls clean through the use of convenient removable liners.

2. Description of the Prior Art

The use of pet feeding dishes is known in the prior art. More specifically, feeding dishes heretofore devised and utilized for use in feeding pets are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,428,325 to Koch discloses a feeding bowl and liner therefor.

U.S. Pat. No. 3,661,121 to Zielin discloses a dog feeding apparatus.

U.S. Pat. No. 3,698,594 to Boechlert discloses a disposable feeding dish and its complementary receptacle.

U.S. Pat. No. 4,587,930 to Trego discloses a pet feeding dish having disposable liner and stationary mounting means.

While these devices fulfill their respective, particular objectives and requirements, the aforementioned patents do not disclose keeping pet food bowls clean through the use of convenient removable liners.

In these respects, the pet feeding system according to the present invention substantially departs from the conventional concepts and designs of the prior art, and in so doing provides an apparatus primarily developed for the purpose of providing a plurality of removable liners within a pet feeding dish.

Therefore, it can be appreciated that there exists a continuing need for a new pet feeding dish which employs a number of removable liners. In this regard, the present invention substantially fulfills this need.

SUMMARY OF THE INVENTION

In view of the foregoing disadvantages inherent in the known types of pet feeding dishes now present in the prior art, the present invention provides a new pet feeding dish construction wherein a single dish is utilized with a number of removable liners. As such, the general purpose of the present invention, which will be described subsequently in greater detail, is to provide a new pet feeding dish and feeding method which has many of the advantages of the pet feeding dishes mentioned heretofore and many novel features that result in a pet feeding system which is not anticipated, rendered obvious, suggested, or even implied by any of the prior art pet feeding dishes, either alone or in any combination thereof.

To attain this, the present invention generally comprises a new and improved animal feeding system comprising, in combination, a bowl having an inner surface, an outer surface, a bottom, and an upper periphery; a hollow circular base having a top and a bottom, the top of the hollow circular base being integral with the bottom of the bowl; a circular weight positioned within the hollow circular base, the circular weight functioning to keep the base and the bowl in an upright orientation; a plurality of liners, each of the liners having a shape which approximately conforms to the inner surface of the bowl, each of the liners further having an inner surface, an outer surface, an upper periphery, a thumb notch formed along the upper periphery, and an adhesive tab formed along the upper periphery, the plurality of liners being in a stacked relationship such that the outer surface of the second liner lies adjacent the inner surface of the first liner, and the inner surface of the second liner lies adjacent the outer surface of the third liner, furthermore the liners are angularly related to one another such that the thumb notches and adhesive tabs of adjacent liners are next to one another, the adhesive tabs functioning to lightly secure adjacent liners to one another, the plurality of liners being positioned within the inner surface of the bowl.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet feeding dish apparatus and feeding method which has many of the advantages of the pet feeding dish mentioned heretofore and many novel features that result in a pet feeding system which is not anticipated, rendered obvious, suggested, or even implied by any of the prior art pet feeding dishes, either alone or in any combination thereof.

It is another object of the present invention to provide a new pet feeding dish which may be easily and efficiently manufactured and marketed.

It is a further object of the present invention to provide a new pet feeding dish which is of a durable and reliable construction.

An even further object of the present invention is to provide a new pet feeding dish which is susceptible of a low cost of manufacture with regard to both materials and labor, and which accordingly is then susceptible of low prices of sale to the consuming public, thereby making such pet feeding dishes economically available to the buying public.

Still yet another object of the present invention is to provide a new pet feeding dish which provides in the apparatuses and methods of the prior art some of the advantages thereof, while simultaneously overcoming some of the disadvantages normally associated therewith.

Still another object of the present invention is to provide a new an animal feeding system comprising, in combination, a bowl having an inner surface, an outer surface, a bottom, and an upper periphery; a base having a top and a bottom, the top of the base being integral with the bottom of the bowl; a plurality of liners, each of the liners having a shape which approximately conforms to the inner surface of the bowl, each of the liners further having an inner surface, an outer surface, and an upper periphery, the liners being in a stacked relationship such that the outer surface of the second liner lies adjacent the inner surface of the first liner, and the inner surface of the second liner lies adjacent the outer surface of the third liner, the liners being positioned within the bowl of the system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded perspective view of the pet feeding dish of the prior Figures.

The same reference numerals refer to the same part throughout the various Figures.

DESCRIPTION OF THE PREFERRED EMBODIMENT

Figure 1:
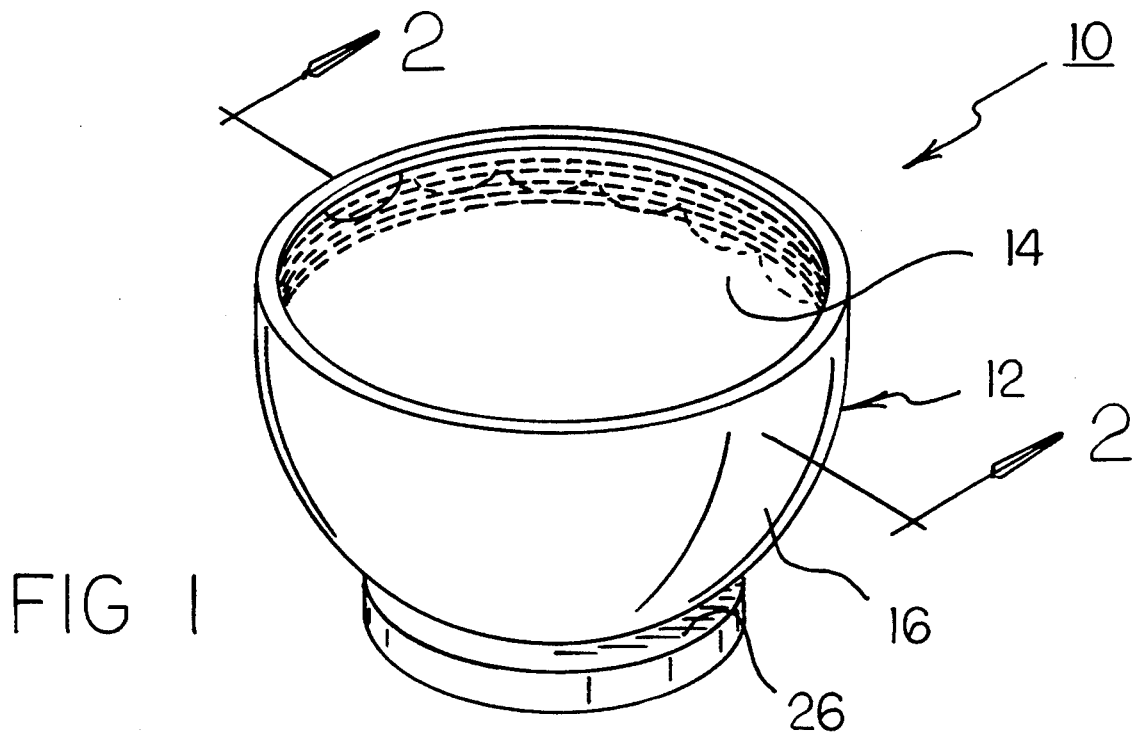
FIG. 1 is a perspective view of the preferred embodiment of the new and improved pet feeding system with disposable inserts constructed in accordance with the principles of the present invention.
Figure 2:
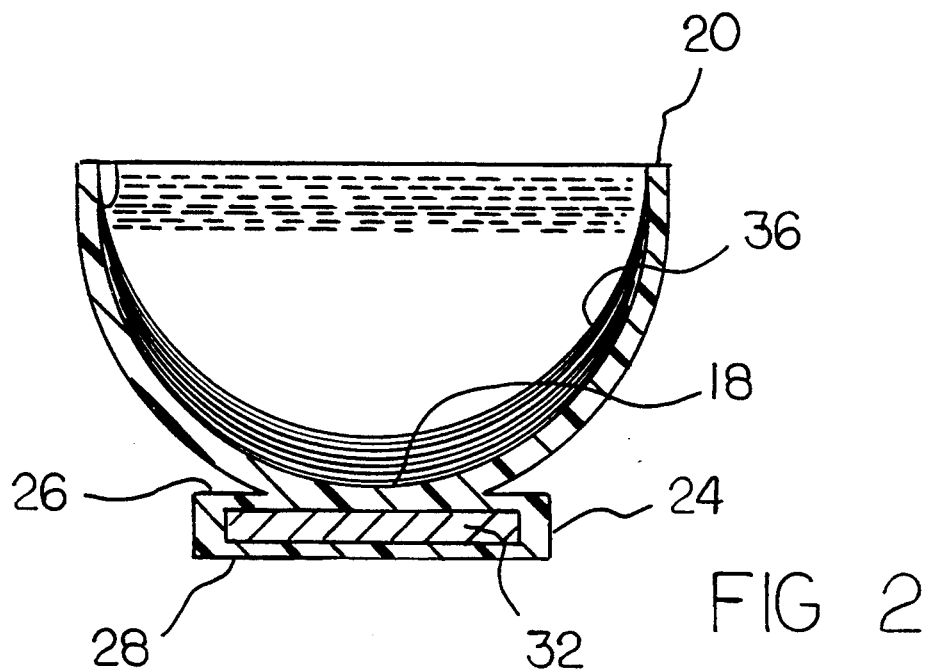
FIG. 2 is a cross sectional view of the pet feeding dish taken along line 2—2 of FIG. 1.

With reference now to the drawings, and in particular to FIGS. 1 through 3 thereof, a new pet feeding system with disposable inserts embodying the principles and concepts of the present invention and generally designated by the reference numeral 10 will be described.

Specifically, it will be noted that the new and improved pet feeding system with disposable inserts comprises, in its broadest context, a plurality of components including a bowl, a base, a weight, and liners. Such components are individually configured and correlated one with respect to the other to attain the desired objective.

More specifically, the bowl 12 has an inner surface 14, and outer surface 16. It also has a bottom 18 and an upper periphery 20. The bowl has curved sides but any conventional configuration of a bowl could readily be utilized in achieving the purposes of the present invention.

The next major component of the system 10 is a hollow circular base 24. The base has a top 26 and a bottom 28. The top of the hollow circular base is formed integrally with bottom of the bowl 12. The purpose of the base is to allow the bowl to rest in a proper orientation on the floor, ground or other surface at which the pet is to eat from the bowl.

A weight 32 in a circular configuration is preferably positioned within the hollow circular base. The weight adds stability to the weight bowl base combination so that when eating outdoors, a stiff wind will not knock over the bowl and loose the food to be eaten. Similarly, due to the weight, a limited bumping by the pet or its owner will not accidentally tip over the bowl. As such, the weight located at the lower extent of the bowl base combination functions to retain the bowl in the intended upright orientation.

The last major component of the system are the plurality of liners 36. Each of the liners is of an essentially common configuration. The shape of the liners is preferably in the shape of the inner surface of the bowl. Each of the liners includes an inner surface 38 and an outer surface 40. Each liner also has an upper periphery 42. Further, a thumb notch 44 is formed along the upper periphery, preferably on the inner surface thereof. An additional feature of the liner is the use of an adhesive tab 46 formed on the outer surface of the liner adjacent to the upper periphery.

In operation and use, a plurality of liners are provided in a stacked relationship. In this manner, the outer surface of second liner lies adjacent to the inner surface of the first liner. Similarly, the inner surface of the second liner lies adjacent to the outer surface of the third liner. It is also preferred to angularly relate the liners one to another such that the thumb notches and adhesive tabs of next adjacent liners are next to one another, being laterally offset around the circumference. The adhesive tabs function to lightly secure adjacent liners one to another. In this manner, a deliberate force is needed to lift the upper most liner which has been previously filled with food and to remove such top most liner from the remainder of the liners without the subsequent liners therebeneath being lifted from the bowl. Further, in operation and use, the plurality of stacked liners are positioned within the bowl so that the top most liner may receive the food to be eaten by the pet.

The present invention is so named because the interior is cleaned immediately after use, by simply removing a liner. Very conveniently, with this invention, there is no need to replace it. This is made possible because the liner is one of a full stack which is in the feeding bowl. They are lightly attached together to permit the top liner to be removed easily, revealing another identical, fresh and clean liner underneath it. The liners are essentially impermeable, so the food in the liner does not stain the liner underneath it. Biodegradable plastic or paper are used as materials for the liners. Replacement liners, will be made available for purchase to fit feeding system bowl only.

After each meal, the top liner is removed, providing the present invention for the next meal. The pets are fed, the area always looks clean, and more sanitary conditions prevail thanks to this unique arrangement. Of equal importance, is the fact that the owner of the pet is not required to clean the bowl after each use. Since some have two, three, or more pets, this can save a great deal of time and trouble. Dirty feeding bowls are not cleaned very easily, usually the food is literally glued to the bowl.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved animal feeding system comprising, in combination:

a bowl having an outwardly flared inner surface, an outer surface, a bottom, and an upper periphery;

a hollow circular base having a top and a bottom, the top of the hollow circular base being integral with the bottom of the bowl;

a circular weight positioned within the hollow circular base, the circular weight functioning to keep the base and the bowl in an upright orientation;

a plurality of liners, each of the liners having a shape which approximately conforms to the inner surface of the bowl, each of the liners further having an inner surface, an outer surface, an upper periphery, a thumb notch formed along the upper periphery, and a unitary adhesive tab formed along the upper periphery diametrically opposite from the thumb notch for each liner, the plurality of liners being in a stacked relationship such that the outer surface of a second liner lies adjacent the inner surface of a first liner, and the inner surface of a second liner lies adjacent the outer surface of a third liner, furthermore the liners are angularly related to one another such that the thumb notches and adhesive tabs of adjacent liners are circumferentially offset to one another, the adhesive tabs functioning to lightly secure adjacent liners to one another, the plurality of liners being positioned within the inner surface of the bowl.

* * * * *